(No Model.)
B. F. ROBERTS.
CULTIVATOR BLADE.
No. 340,621. Patented Apr. 27, 1886.
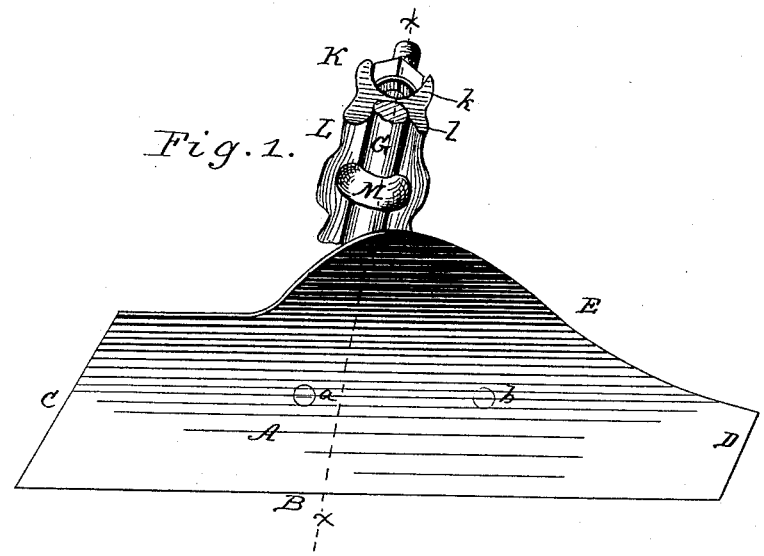
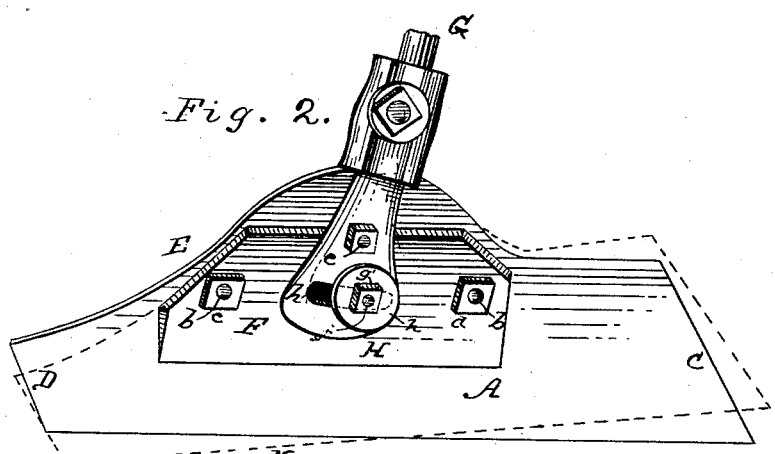
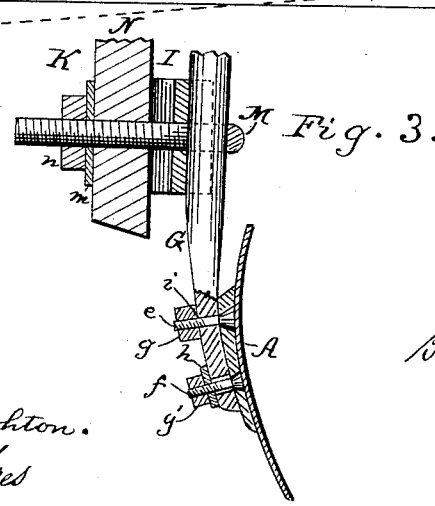
WITNESSES
Thos. Houghton
Jno. N. Voorhies
Benjamin F. Roberts
INVENTOR
by Henry B. Munn
his
Attorney

UNITED STATES PATENT OFFICE.

BENJAMIN F. ROBERTS, OF DUNLAP, IOWA.

CULTIVATOR-BLADE.

SPECIFICATION forming part of Letters Patent No. 340,621, dated April 27, 1886.

Application filed February 19, 1886. Serial No. 192,536. (No model.)

*To all whom it may concern:*

Be it known that I, BENJAMIN F. ROBERTS, a citizen of the United States, residing at Dunlap, in the county of Harrison, State of Iowa, have invented certain new and useful Improvements in Cultivator-Blades, of which the following is a specification, reference being had therein to the accompanying drawings.

My invention relates to cultivator-blades and devices for attaching them to the ordinary cultivator or plow beam; and it consists of a blade having a new and useful form with a strengthening bar or plate attached to its back side by adjusting-bolts with heads countersunk into its face, and also in connecting the blade and plate to the standard in a novel manner, and the standard to the beam, so that the blade may be adjusted in any desired way, as hereinafter described.

In the drawings, Figure 1 is a front plan view of the blade. Fig. 2 is a rear plan view of the same with the strengthening-plate and standard, and Fig. 3 is a vertical section on the line $x\,x$ of Fig. 1.

The blade A is constructed of a single plate of steel or other suitable material, in the shape and form shown in all the drawings. Its lower edge, B, is straight. Its front and rear edges, C and D, are parallel, or nearly so, with each other and inclined backward, the front end being double the width of the opposite one, all as clearly shown in Figs. 1 and 2. The upper edge runs from the front edge first parallel, or nearly so, with the bottom edge for about one-fourth of its length, then turns and runs upward to about the middle of the length of the blade, then downward to the rear end or heel of the blade, making an oval curve, as shown in Figs. 1 and 2. The front end of the blade, toward its upper front edge, is curved slightly backward, while the portion embraced within the curve of the upper edge is bent in a curve forward, as shown in Fig. 1, and for reasons hereinafter stated.

To the back of the blade A a strengthening bar or plate, F, is secured by means of bolts $a$ and $b$ and nuts $c$ and $d$, as shown in Fig. 2. The heads of these bolts are sunk into the face of the blade, so as to leave a smooth surface, as shown in Fig. 1. This plate is provided with two rigid studs or pins, $e f$, having screw-threaded ends provided with nuts $g\,g'$, as shown in Figs. 2 and 3, to secure the plate to the standard G by passing the upper pin, $e$, through a hole, $i$, and the lower pin, $f$, through a slot, $h$, in the standard, and then tightening the nuts $g\,g'$, as shown in the same figures. The lower end of the standard is made flat and broad, so as to have a large surface to bear against the plate, and to allow the slot $h$ to be made of any desired length. A washer, $n$, may be used under the nut $g'$ and over the slot $h$, if desired, as shown also in same figures. By means of these devices the blade A can be tilted or inclined by loosening the nuts $g\,g'$ and turning upon the pin $e$, as shown by the dotted lines on Fig. 2.

The standard G is secured to a cultivator-beam, N, by an attaching device, K, consisting of a malleable casting, L, with grooves $k\,l$, and eyebolt M, running through the casting, and provided with washer $m$ and tightening-nut $n$, all as shown in Fig. 3. When the upper end of the standard is passed through the eyebolt Z and the latter is secured to the beam N, it will be seen that the blade A, in addition to the tilting adjustment on the pin $e$, can also be adjusted vertically and horizontally by adjusting the standard in the eyebolt of the attaching device.

For operation in the field four of these blades are attached to the beam—that is, two on each side, and arranged in reference to each other so as to cover most of the space between the rows of plants being cultivated. When properly arranged and adjusted, they will allow of rapid movement, destroying all the weeds, and at the same time throwing the broken soil up toward the plants on either side and leaving a depression midway between them. This is accomplished by the different curves on the face of the blade. The backward curve near its front allows it to enter the soil easily, and then the forward curve of its broad center throws the soil forward, while the incline onto the narrow heel distributes it evenly.

For actual use the blade may be twelve and one-half inches long, four inches across its front end, and two inches across the heel, with a breadth of six and one-half inches across the center to top of curve.

I am aware of the form of the scraper-blade shown in Patent No. 239,523, issued to McEwen and Adams; but this I do not claim.

Having thus described my invention, what I do claim is—

1. A cultivator-blade of the outline and form substantially as herein shown and described—that is, having its lower edge straight, its front and rear ends parallel and inclined backward, the former being double in width of the latter, its upper edge from the front end first straight, and then running in an upward oval curve, and ending in a sloping one at the heel or rear end, and also having its upper front portion curved backward, with the central portion embraced by the oval line curved forward.

2. In combination with the blade A, constructed as described, the strengthening-plate F, provided with the pins $e$ and $f$, and the standard G, having its lower end flat and provided with the slot $h$, as and for the purpose set forth.

3. In combination with the blade A, strengthening-plate F, and standard G, the device K, consisting of a malleable grooved casting, L, with eyebolt M, washer $m$, and tightening-nut $n$, for adjustably attaching the standard to the plow-beam, as shown and described.

In testimony whereof I affix my signature in presence of two witnesses.

BENJAMIN F. ROBERTS.

Witnesses:
H. B. LYMAN,
L. A. SHERMAN.